United States Patent [19]

Drumright et al.

[11] Patent Number: 5,618,900
[45] Date of Patent: Apr. 8, 1997

[54] FREE RADICAL POLYMERIZATION

[75] Inventors: Ray E. Drumright, Midland; Robert H. Terbrueggen, Sanford; Duane B. Priddy; Robert A. Koster, both of Midland, all of Mich.

[73] Assignee: The Dow Chemical Company, Midland, Mich.

[21] Appl. No.: 586,262

[22] Filed: Jan. 16, 1996

[51] Int. Cl.[6] .................... C08F 120/14; C08F 112/06; C08F 120/10; C08F 120/06

[52] U.S. Cl. .................... 526/329.7; 526/242; 526/264; 526/262; 526/303.1; 526/306; 526/317.1; 526/318.2; 526/328; 526/335; 526/343; 526/344; 526/319; 526/341; 526/346; 526/352

[58] Field of Search .................... 526/329.7, 242, 526/262, 264, 303.1, 306, 317.1, 318.2, 319, 328, 335, 343, 344, 341, 346, 352

[56] References Cited

U.S. PATENT DOCUMENTS

4,675,426  6/1987  Crivello .................... 556/464

OTHER PUBLICATIONS

D. B. Priddy, Advances in Polymer Science 111, 103–108, 1994.
Recent Advances in Styrene Polymerization, D. B. Priddy, vol. 111 (1994), Sections 4.4–4.4.2, pp. 103–108.
Polymer Bulletin 25, 537–541 (1991) Diradical Polymerization of styrene initiated by ethyl 1-cyano-2-(p-methoxyphenyl) cyclopropanecarboxylate with $ZnCl_2$, Tong Li, et al.
Macromolecules 1991, 24, 2485–2487, Diradical Polymerization of Acrylonitrile Initiated by Ethyl 1-Cyano-2-(p-methoxyphenyl) cyclopropanecarboxylate, Tong Li, et al.
Angew. Chem. Int. Ed. Engl. 1994, 33, No. 17, 1757–1758, a New Synthetic Route to 1,2-Dihydrocyclobutaarenes, Fumio Toda, et al.
Tetrahedron Letters, vol. 33, No. 23, pp. 3277–3280, 1992, Arene 1,4-Diradical Formation From o-Dialkynylarenes, M.F. Semmelhack, et al.
Biradikalpolymerisation. 1. Biradikalische Polymerisation von Methacrylsauremethyl mit N–Nitroso–ε–caprolactam als Initiator, Von Hans Craubner, et al. (No translation available) Aus dem Kernforschungszentrum Karlsruhe und der Badischen Anilin–und Sodafabrik AG, Ludwigshafen a. Rh.
Polymer Bulletin 16, 95–102 (1986), Polymerization, Cyclic silyl pinacole ethers, Crivello, J.V., et al.
Conjugated Polymers, Sep./Oct. 1994, 311–313, Synthesis of Polyphenylenes and Polynaphthalenes by Thermolysis of Enediynes and Dialkynylbenzenes, J. A. John et al.
J. Org. Chem. 1993, 58, 5422, Kinetic and Mechanistic Studies of the Tandem Enediyne–Radical Cyclization, J. Grissom et al.
Amer. Chem. Soc., Reprinted from the J. Org. Chem. 1994, 59, 5114 and 5039 Tandem Enyne Allene–Radical Cyclization via [3] Sigmatropic Rearrangements, J. Grissom et al.
C&EN, Aug. 28, 1995, pp. 28–29, Higher Yield Synthetic Route to Cyclic Enediynes Developed, S. Borman.
Science, vol. 269, Aug. 11, 1995, p. 814, Controlled Acceleration and Inhibition of Bergman Cyclization by Metal Chlorides, B. P. Warner, et al.
J. Org. Chem. 1993, 58, 1651–1652, Thermoaally–Induced One–Step Construction of the Tetracyclic Steroidal Skeleton from Acyclic Enynes–Allenes.
J. Am. Chem. Soc. 1992, 114, 9369–9386, Studies on the Thermal Generation and Reactivity of a Class of $(\sigma,\pi)$–1,4–Biradicals, A. G. Myers, et al.

Primary Examiner—Joseph L. Schofer
Assistant Examiner—Wu C. Cheng

[57] ABSTRACT

A process of polymerizing a monomer capable of undergoing free radical polymerization, comprising contacting the monomer with a diradical initiator at a temperature sufficient to initiate free radical polymerization, wherein said diradical initiator contains sites of C—C unsaturation which cyclize to form a diradical.

21 Claims, No Drawings

FREE RADICAL POLYMERIZATION

BACKGROUND OF THE INVENTION

This invention relates to a free radical polymerization process.

Free radical polymerization of vinyl monomers has been typically initiated using a peroxide or an azo compound as described in *Adv. Polym. Sci.*, 111, 63 (1994) by D. B. Priddy. Peroxides are known to be hazardous materials and are typically diluted for safer handling with inert compounds known as phlegmatizers as described in U.S. Pat. No. 5,347,055, by Priddy et al. Unfortunately, these phlegmatizers can contaminate the final polymer product. Azo initiators are not very efficient and leave potentially toxic residues in the polymer produced.

Diradical initiators have been used previously in free radical polymerizations to produce high molecular weight vinyl polymers as disclosed in Collect Czech. Chem. Commun. 38:1343 by Borsig et al. According to Borsig et al., a polymerization process using diradical initiators produced a higher molecular weight polymethylmethacrylate when compared to a process using monoradical initiators at the same monomer conversion. However, the polymerization rate is reported to be slower in polymerizations using the diradical initiators.

Another free radical polymerization process using cyclic pinacol ethers as diradical initiators has been reported by Crivello et al. in U.S. Pat. No. 4,675,426. However, these initiators also have low polymerization rates when compared to monoradical initiators.

Diradical initiators have also been formed from donor-acceptor substituted cyclopropene as disclosed in Polym. Bull 25:537 and Macromol. 24:2485, by Hall et al. However, the polystyrene produced using this initiator had a bimodal molecular weight distribution containing low molecular weight fractions which may be attributed to self-termination reactions of the diradical.

Peroxides have also been used as diradical or multifunctional initiators. However, it has been found that efficiency decreases with increasing peroxide functional groups in multifunctional peroxide initiators, as disclosed in *Advances in Polymer Science*, Vol. 111 "Recent Advances in Styrene Polymerization", by D. B. Priddy, pages 105–108.

Therefore, it is desirable to obtain a process using a diradical initiator which does not need to be diluted for safer handling and initiates free radical polymerization with high efficiency and high polymerization rates.

SUMMARY OF THE INVENTION

The present invention is a process of polymerizing a monomer capable of undergoing free radical polymerization, comprising contacting the monomer with a diradical initiator at a temperature sufficient to initiate free radical polymerization, wherein said diradical initiator contains sites of C—C unsaturation which cyclize under conditions of the free radical polymerization to form a diradical.

The free radical polymerization process of the present invention uses a diradical initiator which does not need to be diluted for safer handling and initiates free radical polymerization with high efficiency and high polymerization rates.

DESCRIPTION OF THE PREFERRED EMBODIMENTS

The diradical initiators useful in the process of the present invention are compounds which contain multiple sites of C—C unsaturation such that when the initiator is heated to a sufficient temperature, the initiator cyclizes to form a diradical. Examples of such diradical initiators include but are not limited to enediynes, enyne allenes, enediallenes, enynecumulenes, enallenecumulenes, cyclic diynes and other such unsaturated compounds. Enediyne compounds contain at least one double C—C bond and at least two triple C—C bonds. Enyne allene compounds contain at least one double C—C bond, at least one triple C—C bond, and at least one allene group wherein two double C—C bonds are adjacent to each other. Enediallene compounds contain at least one double C—C bond and at least two allene groups. Enynecumulene compounds contain at least one double C—C bond, at least one triple C—C bond, and at least one cumulene chain which is a chain of at least three contiguous double bonds as defined in *Grant & Hackh's Chemical Dictionary* 5th Edition, 1987. Enallenecumulene compounds contain at least one double C—C bond, at least one allene group and at least one cumulene chain. Cyclic diyne compounds contain at least two triple C—C bonds within a ring structure. These compounds may also contain other sites of unsaturation, electron withdrawing groups, alkyl groups, functional groups or ring structures as long as sites of C—C unsaturation are positioned such that cyclization occurs resulting in the formation of a diradical upon heating to a sufficient temperature. Typical diradical initiators are exemplified by the following formulas:

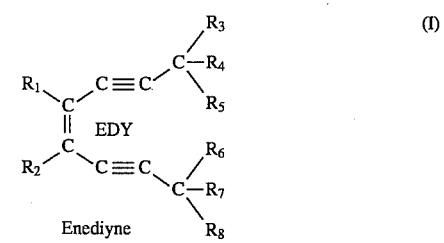

Enediyne (I)

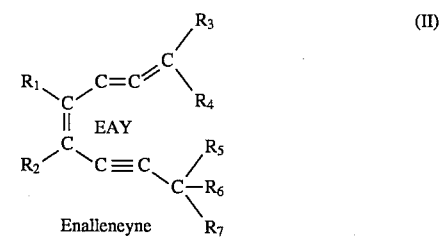

Enalleneyne (II)

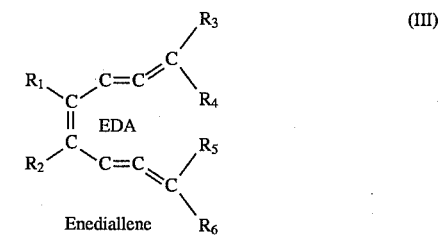

Enediallene (III)

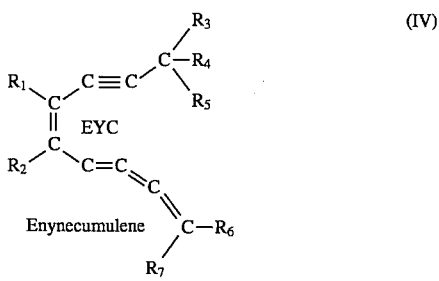

Enynecumulene (IV)

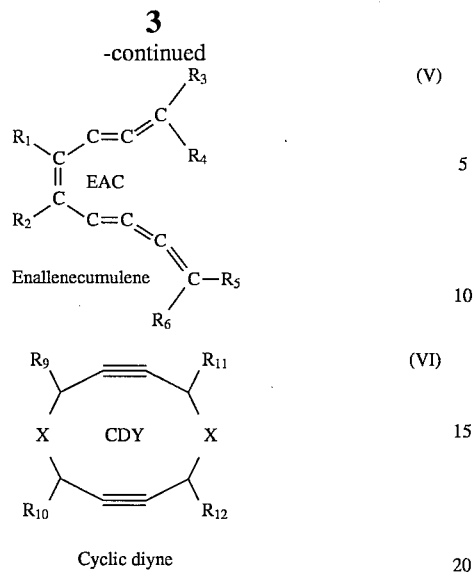

Cyclic diyne wherein $R_1$–$R_{12}$ are independently H, alkyl, alkoxy, thioalkyl, sulfoalkoxy, carboalkoxy, carboamidalkyl, or any other substituent which will not prevent the cyclization and formation of a diradical; X is O, S, N, alkylamine, a sulfur containing group or a phosphorus containing group, and optionally, $R_1$ and $R_2$ may combine to form an arylene or alkylene ring, any two or more $R_{1\text{-}8}$ groups can combine together to form an alkylene ring and any two $R_9$–$R_{12}$ groups can combine together to form an alkylene ring. Typically, any alkyl group or alkyl chain contained within a group contains from 1 to 6 carbon atoms.

Enediynes can be made by several known methods in the art including palladium-mediated coupling of haloalkenes with acetylenes as reported in the following references: Tetrahedron Lett. 1975, 4467, by Sonogashira et al., Synthesis 1980, 627 by Takahashi et al., Synthesis 1986, p. 659, by Duchéne et al., Tetrahedron Review 1977, 33, 2615, by Trost and J. Org. Synth. with Palladium Compounds, Monograph, Spinger-Verlag:NY 1980, by Tsuji.

Enyne allenes can be made by bromoboration of terminal alkynes followed by consecutive Pd(O)-catalyzed coupling reactions with organozinc chlorides derived from terminal alkynes and allenes as disclosed in Tetrahedron Lett. 1994, 35, 1829, by Wang et al.

Enediallene compounds can be prepared by the Pd catalyzed condensation of a 1,2-dihalogen substituted cylcoalkene with 1,1-diphenyl-2-propyn-1-ol to form an enediynediol, which undergoes a propargyl rearrangement upon contact with a $SOX_2$ compound, as disclosed in "A New Synthetic Route to 1,2-Dihydrocyclobutaarenes" Angew. Chem. Int. Ed. Engl. 1994, 33, No. 17, by Toda et al.

Enynecumulene compounds can be prepared by the 1,4 elimination of hydroxytrimethylsilanes from 4-(trimethylsilyl)-2-butyn-1-ols obtained from the condensation of terminal propargylic silanes with conjugated enynyl aldehydes, as disclosed in Tetrahedron Letters, 1995, 36, 3785, by Wang et al.

Eneallenecumulenes can be prepared by treating enyne allenesulfones as disclosed in J. Chem. Soc., Chem. Commun. 1993, 1406, by Toshima et al. and J. Am. Chem. Soco 1995, 117, 4822, by Toshima et al., with a tertiary amine such as 1,8-diazabicyclo [5.4.0] undec-7-ene.

Cyclic diynes can be prepared by the cyclocondensation of amines with brominated alkynes as disclosed in Tetrahedron Letters (1991), 32(25), 2887–90 by Gleiter et al.

Specific examples of the compounds contemplated in the process of the present invention include but are not limited to the following structures:

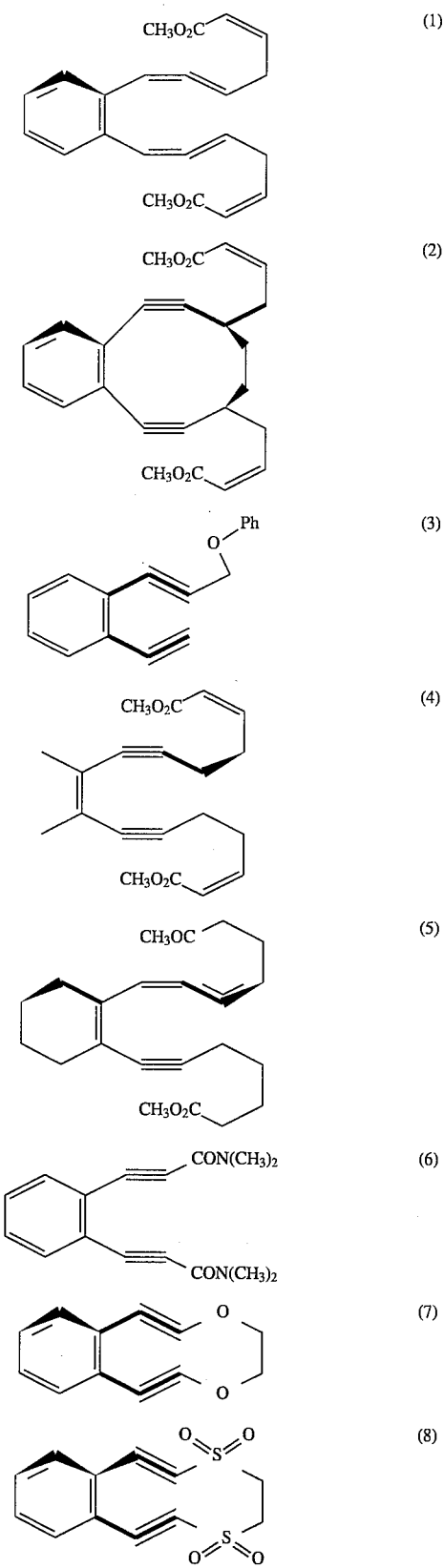

The monomers useful in the process of the present invention include any monomer capable of undergoing free radical polymerization as discussed in "Radical Polymerization", *Encyclopedia of Polymer Science and Engineering*, Vol. 13, pg. 708–865. These monomers include but are not limited to vinyl aromatic monomers such as styrene, diene monomers such as butadiene, chloroprene, isoprene and p-divinylbenzene, acrylate monomers such as butylacrylate and methylacrylate, methacrylate monomers such as methylmethacrylate, beta-hydroxyethylmethacrylate, beta-dimethylaminoethyl methacrylate and ethylene glycol dimethacrylate and other unsaturated monomers including acrylic acid, acrylamide, acrylonitrile, ethylene, tetra-fluoroethylene, triflourochloroethylene, iraconic acid, fumaric acid, maleic acid, methacrylic acid, methacrylonitrile, vinyl acetate, vinyl chloride, vinyl flouride, N-vinylpyrrolidinone, N-vinylimidazole, vinylidene chloride, vinylidene fluoride and N, N'-methylenebis-acrylamide. Monomers copolymerizable with the monomers described above may also be present in the polymerization process of the present invention. In addition, the polymerization may also be conducted in the presence of a predissolved elastomer to prepare impact modified and grafted rubber containing polymers. Preferably, the monomer is methyl methacrylate, n-butyl acrylate or styrene.

The diradical initiator is typically dissolved in monomer and heated to a temperature at which diradicals form. The temperature is dependent upon the structure of the diradical initiator, as different initiators have different radical forming temperatures. Typically, the temperature will be from about 50° to about 150° C.

It is believed that the polymerization will occur at a temperature at which the initiator cyclizes to form a diradical. The formation of diradicals has been discussed in several references such as J. Am. Chem. Soc. 1972, 94, pg. 660 by Jones and Bergman, J. Am. Chem. Soc. 1992, 114, pg. 9369 by Myers et al., J. Angew. Chem., Int. Ed. Engl. 1994, 33, pg. 1757 by Toda et al. and J. Angew Chem., Int. Ed. Engl. 1994, 33, pg. 2470 by Gleiter et al., and J. Angew. Chem., Int. Ed. Engl. 1991, 30, pg. 1387 by Nicolaou et al., among others. Several schemes showing cyclization resulting in the formation of diradicals (and resonance structures thereof) upon heating are shown below:

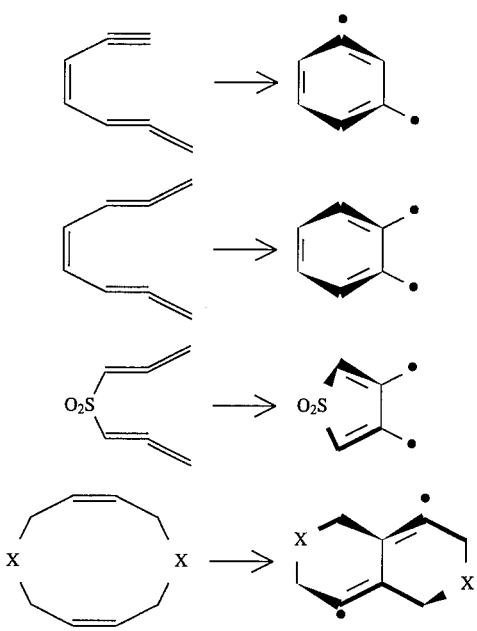

wherein X represents a connecting group such as those exemplified in structures 16–21.

The diradical initiates polymerization in the presence of one or more monomers wherein chain growth occurs from both radical sites within the diradical.

To optimize the polymerization process of the present invention, the diradical initiator should be chosen according to the monomer being polymerized. Monomers which have a negative "e" value, e.g. vinyl aromatic monomers, as disclosed in J. Polym. Sci. 2, pg. 101(1947) by T. Alfrey and C. C. Price, which is incorporated herein by reference, are preferentially initiated by electrophilic diradical initiators. Electrophilic diradical initiators are defined as initiators preferentially attracted to electron rich double bonds and are exemplified in formulas 1, 2, 4–6, 8–9, 11, 13–14, and 19–20. Monomers which have a positive "e" value, e.g. acrylates, are best initiated by nucleophilic radicals. Nucleophilic diradical initiators are defined as initiators preferentially attracted to electron deficient double bonds and are exemplified in formulas 3, 7, 10, 12, 15–18 and 21.

The diradical initiators described in formulas I–VI, wherein $R_{1-12}$ are not an electron withdrawing group, tend to be nucleophilic. However, when these compounds contain an electron withdrawing group such as a cyano, carboxyl, nitro, sulfoxy and the like, the radicals which form can tend to be electrophilic.

The location of an electron withdrawing group relative to the radical sites is important in determining electrophilicity or nucleophilicity. An electron withdrawing group located in conjugation with the radical sites will tend to be an electrophilic initiator such as shown in structure 8. However, if an electron withdrawing group is isolated from the radical sites, the initiator will tend to be nucleophilic such as in structure 10. The terms nucleophilic and electrophilic are well known in the art and one skilled in the art should be able to ascertain whether an initiator would tend to be electrophilic or nucleophilic.

The amount of diradical initiator used in the process of the present invention is not critical provided that the amount selected together with the temperature of the polymerization is such that the polymerization proceeds at an acceptable rate and a desirable Mw polymer is attained. In general, increasing amounts of initiator favors faster reaction rates and lower Mw. Typically, from about 10 to about 2,000 ppm, preferably from about 100 to about 1,000 ppm and most preferably from about 200 to about 600 ppm.

The diradical initiator used in the process of the present invention can also be combined with other diradical initiators or with other initiators used in free radical polymerization processes, e.g. peroxides and azo compounds. Other initiators may be added simultaneously with the diradical initiators or at any stage in the polymerization reaction. The polymerization may be initiated by a traditional initiator, e.g. peroxide or azo initiator, as a first step followed by the addition of a diradical initiator as in the process of the present invention. Other initiators include but are not limited to tert-butylperoxybenzoate, tert-butylperoxyacetate, di-tertbutylperoxide, dibenzoylperoxide, dilauroylperoxide, 1,1-bis-tertbutyl peroxycyclohexane, 1,1,-bis-tert-butylperoxy-3,3,5-trimethylcyclohexane and dicumylperoxide. Typical amounts of these types of initiators are from 10 ppm to 2000 ppm based on the amount of monomer in addition to the diradical initiators described previously.

Additionally, other additives may be present in the process of the present invention including antioxidants, plasticizers, flame retarding agents, chain transfer agents and the like.

The particular conditions of the polymerization process are not critical provided that the polymerization occurs at an acceptable rate. Suitable polymerization conditions are well known in the art and described in U.S. patents such as U.S. Pat. No. 5,191,040, 5,087,738 and U.S. Pat. No. 4,275,182 which are incorporated herein by reference. The free radical polymerization may be a bulk, solution, emulsion or suspension process. Preferably, the process of the present invention is a continuous bulk or solution polymerization.

The amount of time needed for the polymerization is dependent upon a number of factors including the initiator concentration, the percent conversion desired and the reaction temperature. Typically, the polymerization is conducted from 0.5 to 8 hours, preferably from 1 to 6 hours and most preferably from 1 to 5 hours.

The following example is provided to illustrate the present invention. The example is not intended to limit the scope of the present invention and it should not be so interpreted. Amounts are in weight percentages.

5,6,11,12-tetradehydro-7,8,9,10-tetrahydrobenzocyclodecene (Cas RN 35335-05-8) is synthesized following the method disclosed in "Arene 1,4-diradical formation from o-dialkynylarenes", Tetrahedron Letters, Vol. 33, No. 23, pp. 3277–3280, (1992) by Semmelhack et al.

EXAMPLE 1

5,6,11,12-Tetradehydro-7,8,9,10-tetrahydrobenzocyclodecene is dissolved in N-butylacrylate at a concentration of 500 ppm. Two ml of this solution is placed into a glass ampoule measuring 3/16"×3/8". The ampoule is sealed under vacuum using the freeze-thaw technique to remove gases and the ampoule is heated at 140° C. for 15 minutes. The ampoule is then opened and the conversion of the monomer to polymer is determined using gravimetric analysis. The conversion is determined to be 72%. The Mw is determined to be 762,000 by gel permeation chromatography (GPC).

What is claimed is:

1. A process of polymerizing a monomer capable of undergoing free radical polymerization, comprising contacting the monomer with a diradical initiator at a temperature sufficient to initiate free radical polymerization, wherein said diradical initiator contains sites of C—C unsaturation which cyclize to form a diradical.

2. The process of claim 1 wherein the diradical initiator is selected from the group consisting of enediynes, enyne allenes, enediallenes, enynecumulenes, eneallenecumulenes, and cyclic diynes.

3. The process of claim 1 wherein the monomer is selected from the group consisting of styrene, butadiene, chloroprene, isoprene, p-divinylbenzene, butylacrylate, methylacrylate, methylmethacrylate, beta-hydroxyethylmethacrylate, betadimethylaminoethyl methacrylate, ethylene glycol dimethacrylate, acrylic acid, acrylamide, acrylonitrile, ethylene, tetrafluoroethylene, triflourochloroethylene, itaconic acid, fumaric acid, maleic acid, methacrylic acid, methacrylonitrile, vinyl acetate, vinyl chloride, vinyl flouride, N-vinylpyrrolidinone, N-vinylimidazole, vinylidene chloride, vinylidene fluoride and N, N'-methylenebisacrylamide.

4. The process of claim 3 wherein the monomer is styrene.

5. The process of claim 3 wherein the monomer is methyl methacrylate or n-butylacrylate.

6. The process of claim 3 wherein two or more monomers are polymerized.

7. The process of claim 6 wherein the monomers are styrene and butadiene.

8. The process of claim 1 wherein the monomer has a negative "e" value and the initiator is electrophilic.

9. The process of claim 1 wherein the monomer has a positive "e" value and the initiator is nucleophilic.

10. The process of claim 1 wherein the temperature is between about 50° to about 150° C.

11. The process of claim 1 wherein the diradical initiator is present in an amount of from about 10 to about 2000 ppm based on the amount of monomer.

12. A process of polymerizing a monomer capable of undergoing free radical polymerization, comprising contacting the monomer with a diradical initiator selected from the group comprising enediynes, enyne allenes, enediallenes, enynecumulenes, eneallenecumulenes, and cyclic diynes at a temperature at which free radical polymerization occurs.

13. The process of claim 12 wherein the monomer is selected from the group consisting of styrene, butadiene, chloroprene, isoprene, p-divinylbenzene, butylacrylate, methylacrylate, methylmethacrylate, beta-hydroxyethylmethacrylate, betadimethylaminoethyl methacrylate, ethylene glycol dimethacrytate, acrylic acid, acrylamide, acrylonitrile, ethylene, tetrafluoroethylene, triflourochloroethylene, iraconic acid, fumaric acid, maleic acid, methacrylic acid, methacrylonitrile, vinyl acetate, vinyl chloride, vinyl flouride, N-vinylpyrrolidinone, N-vinylimidazole, vinylidene chloride, vinylidene fluoride and N, N'-methylenebisacrylamide.

14. The process of claim 13 wherein the monomer is styrene.

15. The process of claim 13 wherein the monomer is methyl methacrylate or n-butylacrylate.

16. The process of claim 13 wherein two or more monomers are polymerized.

17. The process of claim 16 wherein the monomers are styrene and butadiene.

18. The process of claim 13 wherein the monomer has a negative value and the initiator is electrophilic.

19. The process of claim 13 wherein the monomer has a positive "e" value and the initiator is nucleophilic.

20. The process of claim 13 wherein the temperature is between about 50° to about 150° C.

21. The process of claim 13 wherein the diradical initiator is present in an amount of from about 10 to about 2000 ppm based on the amount of monomer.

* * * * *

UNITED STATES PATENT AND TRADEMARK OFFICE
CERTIFICATE OF CORRECTION

PATENT NO : 5,618,900

DATED : April 8, 1997

INVENTOR(S) : Ray E. Drumright et al.

It is certified that error appears in the above-identified patent and that said Letters Patent is hereby corrected as shown below:

In claim 13, line 12, "iraconic" should correctly read --itaconic--.

Signed and Sealed this

Twenty-seventh Day of February, 2001

Attest:

NICHOLAS P. GODICI

Attesting Officer     Acting Director of the United States Patent and Trademark Office